United States Patent Office 3,302,290
Patented Feb. 7, 1967

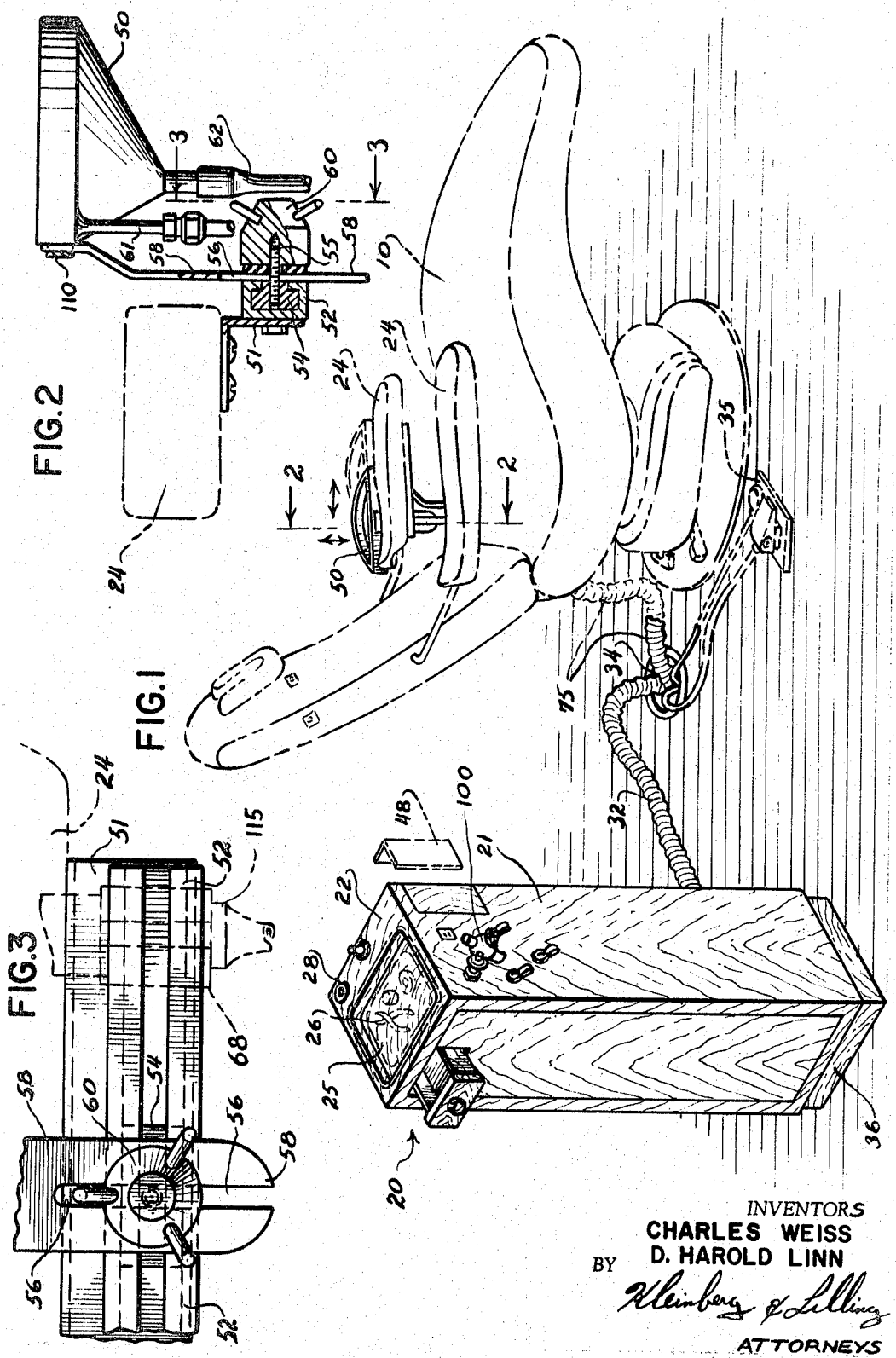

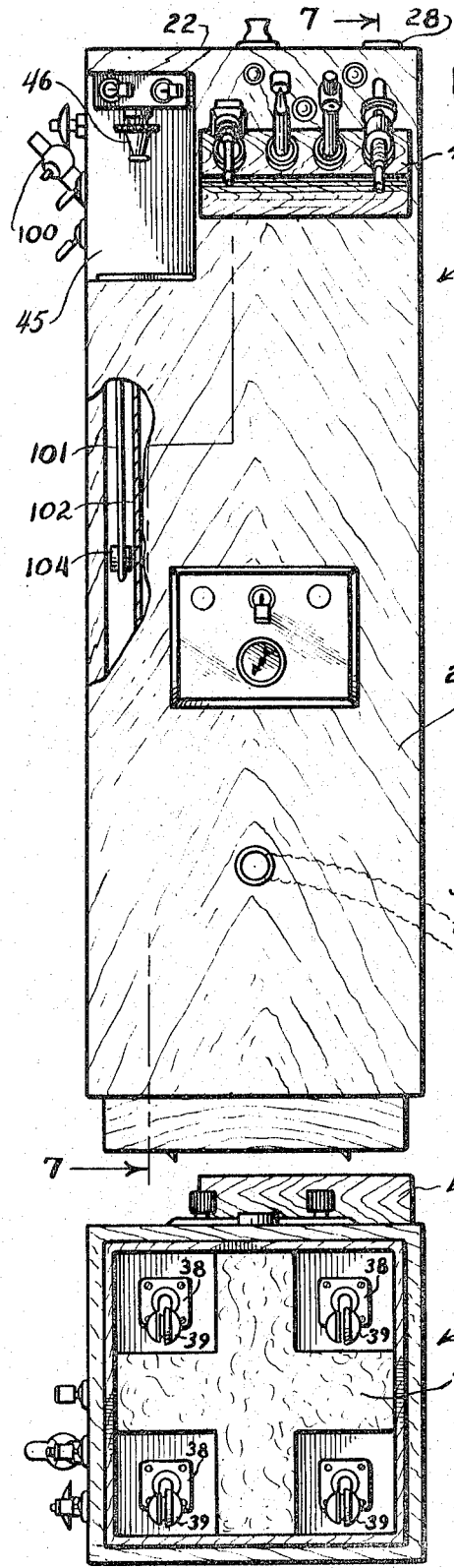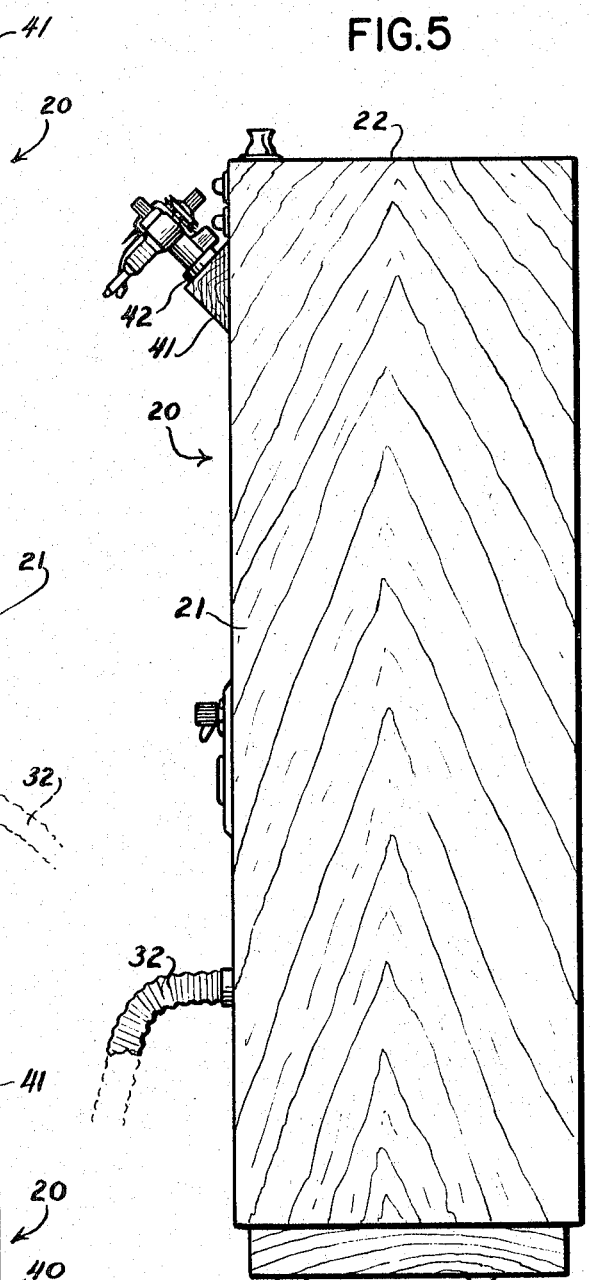

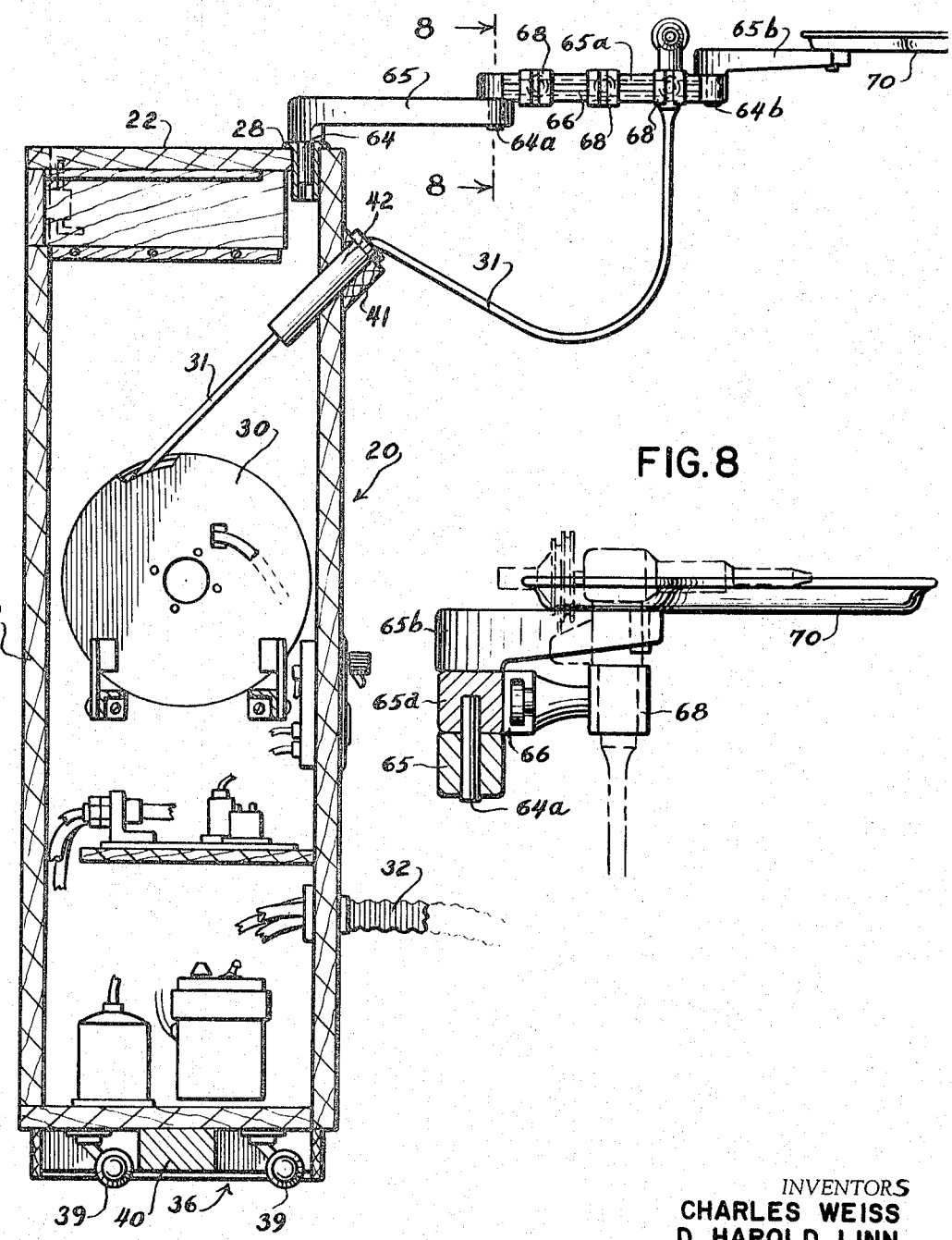

3,302,290
DENTAL UNIT
Charles Weiss and David Harold Linn, New York, N.Y., assignors to S. S. White Company, Philadelphia, Pa., a corporation of Pennsylvania
Filed Sept. 16, 1963, Ser. No. 309,232
11 Claims. (Cl. 32—22)

The present invention relates in general to dental units of the type utilized by medical practitioners.

There are known in the prior art very many dental units for use in the dentist's office or the like. Such units all suffer from several well known deficiencies.

For example, they are generally relatively large, not esthetic, with many appendages for the various dental instruments, and are fixed in relation to the dental operating chair. Further, the usual dental operating accessories will be readily visible to the patient and will have obvious adverse psychological results.

Additionally, the usual equipment is relatively inflexible both as to usage and function. One of the major problems concerning dental equipment today revolves around the utilization of such equipment for the newer techniques of dental operating commonly referred to as "time-motion" procedures. Many dental practitioners are not trained in these newer methods and will prefer to carry out operations in the traditional dentist-patient positions. Even after such practitioners learn the newer "time-motion" techniques, they will still, at times, prefer the more traditional positions. Therefore, convertible dental operating equipment that will be usable both in the traditional manner and in the newer "time-motion" manner, will be especially valuable.

The present operating equipment limits dental practitioners to the traditional technique. This is, of course, unsatisfactory and equipment that would not limit the practitioner and that would permit the utilization of either of the two techniques, at any time, with little or no change of equipment, would be of extreme value.

Furthermore, for obvious psychological reasons, and for better patient acceptance, it would be preferable if dental operating units were small and esthetic as opposed to the bulky units presently available.

A cardinal object of this invention, therefore, is the provision of a dental unit which will be constructed and arranged to overcome the above-mentioned disadvantages.

Another primary object of the instant device will be to set forth a more flexible operating unit which will assist the dentist in performing the usual operations, in any of the preferred manners.

Another object and accomplishment of this device is the provision of a dental unit that will more efficiently utilize space in the dental practitioner's office, may be readily moved about the operating room, and that may be constructed to more suitably blend with the remainder of the room.

Still another object of this device is to describe a dental unit for a dental operating office that may be quickly and easily installed therein.

A still further purpose of this device described herein is the provision of a dental unit that will insure the ready availability of the usual dental tools to the practitioner whether or not a nurse or assistant is available, and no matter what technique the dental practitioner utilizes (traditional techniques, or time-motion techniques).

The above objects and accomplishments are accomplished by setting forth a dental operating unit of a type never before available. The operating unit set forth herein will be small and esthetic. All of the operating instruments that are to be utilized in operating in the oral cavity will be retractable, even including a central suction arrangement. Bracket tables, and handpiece, and syringe holding arms will be completely adjustable to any required position, and will be instantly removable, when desired. The water niche will be arranged so as to be visible (and supply hot and/or cold water) when traditional methods of operating are in use. The same water niche will be capable of being quickly concealed when "time-motion" procedures are utilized. The cuspidor, which as usual, will rinse itself automatically, will be mounted on the arm of the operating chair with complete height, angle, and forward and back adjustments quickly possible. Further, the cuspidor may be quickly disconnected and removed when "time-motion" procedures are to be employed. If desired, a smaller cuspidor will be provided with a quick-disconnect from the chair arm to be utilized when desired with "time-motion" operating techniques. With the patient in the horizontal position, as will generaly be the case with such techniques, it may then be quickly brought to the mouth of the patient. As is usual, even the smaller cuspidor may be automatically flushed. The instrument holders will fit into adjustable slots on the bracket arm, or if desired, the arm of the chair, and may be adjusted to a variety of positions in either of the locations to always provide the practitioner and the assistant with ready access at all times.

The new and improved unit set forth herein, may be quickly and easily moved to any floor position in and about the operating chair. Thus, the practitioner may work with assistants or without such assistants, and in any event, will always have the operating unit in the most convenient and desirable location.

All of the controls for the operating unit such as the on-off switches, the cuspidor flushing control, the operating dental light switch, the central suction control, the hot and cold water controls, will all be conveniently placed for ready access on the operating unit, as well as on the back of the dental operating chair and on the foot control box for ready positioning for the convenience of the practitioner. The necessary functions will now be capable of being carried out from almost any location. The dentist or his assistant need not move to get to the operating unit nor inconvenience the patient, but may bring the operating unit to the patient. The operating unit can incorporate several combinations of handpieces, such as either of the high speed or low speed type, may incorporate central suction units, saliva ejectors, combination air-water-spray syringes (or any one of them), ultrasonic devices, malletors, etc. Almost anything a dental practitioner will require may be retractably built into this operating unit.

Further, installation and pre-plumbing of the unit will be greatly reduced. Generally, no city waste supply will be required in combination with this unit.

With these objects in view, the invention consists of the novel features of construction and arrangement of parts which will appear in the following specification and recited in the appended claims, reference being had to the accompanying drawings in which the same reference numerals indicate the same parts throughout the various figures and in which:

FIG. 1 is a view in perspective of the improved dental unit installed adjacent a dental operating chair, with the chair and some of the controls illustrated in phantom.

FIG. 2 is a sectional elevational view of one of the cuspidors utilized in conjunction with this invention with the arm of the dental chair again illustrated in phantom.

FIG. 3 is a sectional elevational view taken substantially along line 3—3 of FIG. 2 illustrating one mode of attachment of the cuspidor or a handpiece to the arm of the dental operating chair.

FIG. 4 is a front elevational view of the dental unit with the water niche cover removed and a portion of the housing broken away to show the central suction tubing retracting device.

FIG. 5 is a side elevational view of the dental unit taken from the right side of FIG. 4.

FIG. 6 is a bottom plan view of the dental unit.

FIG. 7 is a sectional elevational view taken substantially along line 7—7 of FIG. 4 showing some of the interior workings of the unit, and further illustrating one embodiment of extension arms which may be utilized thereon.

FIG. 8 is a sectional elevational view taken substantially along line 8—8 of FIG. 7, and illustrating one of the dental operating handpieces installed thereon in phantom.

Referring to the drawings, there is illustrated one preferred embodiment of the invention.

Illustrated in FIG. 1, is a dental operating chair 10. The said chair 10 may be of the conventional type, of the newer contour type, or any other similar unit. It is to be noted that the chair illustrated is merely for exemplary purposes.

The dental unit 20 is in the form of a frame or stand which will support the various appliances necessary to the practice of dentistry.

Such stands, as known in the prior art, consist generally of a tubular frame or the like, with a plurality of universal arms to suspend the necessary dental appliances. Such apparatus is esthetically unsuitable and further, will permit all of the appliances to be in full view of the patient at all times.

This embodiment of this invention, however, consists generally of a hollow pillar-like stand which is relatively small and may generally be square in horizontal cross-section.

As illustrated, the horizontal top 22 of the unit is somewhat above the arm 24 of the dental chair and at a convenient elevation for the dental practitioner. The said top 22 includes a recessed portion 25 to receive sterilized trays and to contain various operating instruments as at 26. As will be explained hereinafter, the same trays may function in conjunction with extension arms. The top 22 further includes a bushing 28 to receive and support the said extension arms.

As will be seen especially in FIG. 7, the substantially hollow pillar-like stand 21 incorporates therewithin most of the equipment, connections, drives, and the like, for the operation of the unit. The interior workings of the unit will not be described in detail as individually it will form no part of the inventive concept of this invention, with the provision that such components must be arranged and installed within the interior of the pillar-like stand 21. It will be realized that such space is relatively small and only a limited number of substitutions for components will be possible. Incorporated, however, are a plurality of pulleys as at 30 to retain the tubing 31 and the like necessary for the operation of the usual dental accessories. The said pulleys 30 may be spring loaded to wind the tubing or the like 31 thereon. Thus, the dental accessories may be urged away from the dental unit 20 by the practitioner for use, and will return to the unit or to the appropriate holder when released.

As will be seen especially in the broken-away portion of FIG. 4, the central suction connection 100 will require a somewhat different method of extending and retracting its connecting tube 101 in view of the size and relative inflexibility of the tubing. As shown then in FIG. 4, the central suction tubing 101, will be contained within an exterior wall of the unit and an interior wall 102 will be spaced in juxtaposition thereto. The tubing 101 will be looped within the housing 20 and under a freely suspended weight 104. The weight 104 with felt lined sides for silencing, will be of sufficient thickness to fit between the exterior wall of the unit and the interior wall 102 with but little clearance. Thus, the said weight 104 will tend to bias the tubing 101 looped thereunder in a downward direction thus retracting the central suction connector 100 to the position shown in FIG. 4. When the said central suction connector 100 is urged away from the dental unit 20, the length of tubing 101 within the unit 20 will be somewhat shortened, thereby urging the weight 104 in an upward direction. When, of course, the connector 100 is released, the weight 104 will retract the connector 100 as previously described.

Flexible tubing 32 interconnects the interior of the dental unit 20 with an opening 34 as in the floor adjacent the dental operating chair 10 and encases the various tubing and wires from the said opening 34 to the interior of the said unit. Included within the said wires being conducted by the flexible tubing 32 are those necessary to control the actuation of the individual components of the unit remotely in conjunction with the usual floor pedals 35 or by controls installed suitably on the rear of the back of the dental operating chair 10.

For ease of connection, a suitable manifold is supplied in conjunction with this unit. The manifold, installed under the floor, provides the required utility connections. Further, the said manifold has a form of coded and quick-disconnect connections with the flexible tubing 32. This then will facilitate the installation of the unit, and its possible use in more than one operating room.

At the base of the unit 36, there are a plurality of swivel mounts 38 rotatably supporting wheels 39. The said wheels 39 will permit the entire unit 20 to be easily moved about the dental operating chair easily with little effort on the part of the dental practitioner or the assistant. Merely by light urging the said unit 20 will roll to any desired position about the operating chair as for example, shown in the phantom lines in FIG. 1.

One of the prime objects and accomplishments of this invention is the provision of the relatively small unit containing all of the features and accessories and the like which are normally incorporated only in much larger units. The combining of all of this equipment within the relatively small space, makes necessary the installation of weights 40 at the bottom of the unit 36. The said weights 40 are comprised of one piece of lead or the like, with cutouts for the wheels 39. The weights 40 insure stability of the unit, despite its small size, and notwithstanding the equipment which may be fastened to the extension arms at the top thereof.

Adjacent the horizontal top 22 of the unit is an angular support 41 containing a plurality of collars 42. Each of the collars 42 will guide one of the tubes 31 or the like and will support the appropriate dental operating accessory at the end of its said tube 31. Thus, the usual dental operating accessories will be supported on the angular support 41 as is illustrated in FIG. 4. The dental practitioner will be able to grasp any of the operating accessories readily and urge the same away from the unit and to the patient against the urging of the pulley 30.

An especially important feature of this invention is the water supply and cuspidor. In most dental units currently in use, the water supply and cuspidor are spatially related in position and are visible at all times to the patient. Certainly the usually visible combination cuspidor and water supply is not pleasant to any patient. As was mentioned heretofore, the newer "time-motion" systems allow the patient to be in a more horizontal position and the water niche will more desirably not be visible and the cuspidor will be hidden. In this newer dental operating technique, the retractable suction device will be connected to a mouth evacuating unit and the mouth is cleansed by a water spray syringe. But, as was mentioned, practitioners may desire a cuspidor and water niche when operating under the more traditional techniques and will preferably not have them visible when operating with the newer techniques. One of the important features of this invention then is the separate cuspidor to be described immediately hereinafter and the coverable water niche in the body of the pillar-like stand 21. The said water niche will be especially apparent in FIG. 4. As will be seen in that figure, a cutout is provided in the side of the unit adjacent the top. The cutout comprising the water niche 45 is of sufficient size to receive a cup or the like to be filled with water. A suitable spout 46 is positioned centrally at the top of the water niche 45 so as to provide a quick and ready means of water supply as into a cup. Further, a suitable drain, not illustrated, is installed at the bottom of the said water niche 45.

Referring now to FIG. 1, it will be seen that the said water niche 45 may be covered when not in use or when otherwise desired, as with the "time-motion" technique. This is accomplished by an angular cover 48 which conforms exactly to the shape of the cutout comprising the water niche 45. Thus, the angular cover 48 when snapped over the water niche 45 completely covers the same and prevents its viewing by the patient. In that the angular cover 48 is comprised of the same external coverings as the remainder of the pillar-like stand 21, it will be indistinguishable from the remainder of the unit. When it is desired to utilize said water niche 45, however, the angular cover 48 may be removed by hand thereby exposing the interior of the said niche 45.

Referring again to FIG. 1, it will be seen that one of the cuspidors 50 to be utilized in conjunction with this invention will be adaptable for installation on the arm 24 of the dental operating chair 10. This, of course, is the most convenient position for the installation of a cuspidor and is more easily accessible for the patient on the said chair. Of course, an additional advantage of installing the cuspidor 50 on the arm 24 will be the somewhat self-adjusting feature. As the back of the usual chair moves rearward, so does the arm 24 of the chair. Thus, the cuspidor 50 will, to a limited extent, move rearward with the patient, as the chair is placed in a reclined position. As was mentioned heretofore, however, it will be desirable to be able to remove the cuspidor 50 from sight, when desired. For this purpose, a quick-disconnect connection is provided between the said cuspidor 50 and the arm 24. Further, the said quick-disconnect connection is of a type which will permit adjustment of the cuspidor 50 on the arm 24, and permit the installation of other operating handpieces.

There will be seen in FIGS. 2 and 3, a method of installing the cuspidor 50 on the arm 24 of the chair 10. Affixed to one of the arms 24 will be a bracket 51 retaining a T slot track 52. An insert 54 shaped like a key to fit within the track 52, will be adapted for slidable movement within the said track 52. A threaded member 55 will horizontally project forward from the insert 54. The threaded member 55 will project through a slot 56 in a vertically extending bracket 58. The cuspidor 50 will be retained by the top of the bracket 58. A hand knob 60 will threadingly connect to the threaded member 55 in a manner so as to be easily tightened or loosened as desired. The slot 56 is vertically elongated to provide adjustment of the height of the bracket 51 and the cuspidor 50 relative to the chair arm 24, and to permit the quick removal of the bracket 51 and cuspidor 50.

Thus, the operation and control of this cuspidor 50 will be apparent. The insert 54 may be loosened within the T slot track 52 merely by loosening the threaded member 55. After the insert 54 is adjusted longitudinally in position along the track 52, and the cuspidor is adjusted to the proper height by urging the bracket 58 to move relative to the threaded member 55, the hand knob 60 will be tightened thereby securely locking the parts in position. Thus, the cuspidor 50 may be quickly and easily positioned for the convenience of the patient merely by the tightening or loosening of one knob. Similarly, the entire cuspidor together with its tubes and connecting bracket and insert may be entirely removed from the arm 24 merely by loosening the knob 60, and pulling the bracket 58 upwards through slot 56, thereby removing the entire bracket and cuspidor assembly. The cuspidor 50 may then be stored until required again for usage. The cuspidor 50 will have the usual water ingress and egress tubes 61 and 62.

Of course, the use of the cuspidor 50 above-mentioned, will be, as set forth hereinbefore, for the traditional operating systems. However, it may at times be preferable even with the newer "time-motion" systems, to utilize a hand cuspidor to be brought directly against the mouth of the patient. For such purpose, a smaller hand cuspidor may be provided. Further, the cuspidor 50 shown in the drawings, may be attached to the bracket 58 by a clip member 110. The clip member will permit the cuspidor 50 to be quickly removed from the bracket 58 and to be maneuvered independantly thereof. Thus, the cuspidor 50 may either be snapped onto the bracket 58 or may be independantly moved closer to the patient as by an assistant, as required.

It will be preferable at times to provide means whereby the dental operating equipment may be moved to positions closer or even overlying a patient. For this purpose, dental operating extension means are provided as shown primarily in FIGS. 7 and 8.

As was mentioned heretofore, a bushing 28 is provided in the top surface 22 of the unit. The said bushing 28 has an internal diameter of sufficient size to receive a shaft-like extending member 64 connected to one end of a horizontal member 65.

The horizontally extending member 65 has an opening at the opposite end thereof of sufficient size to receive a similar shaft-like extending member 64a. The shaft-like extending member 64a will project from a second horizontally extending member 65a. Similarly, the external end of the horizontally extending member 65a will have an opening to receive a third shaft-like extending member 64b which in turn will support a third horizontally extending member 65b. Thus, it is apparent that any number of such extending members may be adapted to fit in the external ends of each other, building up any desired assembly to fit into an area adjacent or overlying a patient. One of the horizontally extending members 65a may have a longitudinally extending slot 66 to receive and position one or more instrument holders 68. Each of the holders 68 is adapted to receive and support one of the dental operating instruments usually located and positioned in the collars 42 in the angular support 41. Thus, the dental operating instruments may be moved when desired from the angular support 41 to supports 68 suitably positioned for the convenience of the medical practitioner. The last of the horizontally extending members 65b may terminate in a tray 70 to support any required dental operating instrument.

Thus, there is provided herein a device accomplishing all of the objects previously set forth and others. The water niche 45 within the body of the unit and easily coverable, together with the removable and adjustable cuspidor 50, attachable on the arm 24 of the chair, are important features of the invention. The provision of the dental engines and all like similar equipment within the body of the pedestal is of further extreme importance. The free adjustment and installation and removal of extension arms at the top of the unit and elimination of the usually necessary counterweights by the provision of the lead weights at the bottom surface 40 is additionally unique. There is complete versatility in the adaptation and use of the unit. In addition to the complete movement possible of the entire unit, the arms will provide additional areas of movement about and around the patient. The dental operating handpieces may be moved to any convenient area for the practitioner. In fact, the handpieces may be supported in brackets in the chair arm 24 fitting within the T slot track 52 as shown at 115 in phantom in FIG. 3.

Generally it will be seen from the foregoing, that what has been provided herein is a dental unit of relatively small size which will present an improved appearance to the patient and will yet afford the practitioner full convenience and versatility.

It is also apparent that the unit may be constructed at a comparatively low cost and produced at a price which will make the same available to all dental practitioners. Other suitable conveniences may be applied to the unit as desired, as for example, suitable drawers, or the like.

Further, it has been found that this unit lends itself readily to remote control operation. In one embodiment of the same already produced, controls for the dental operating handpieces and the like, are positioned at the rear of the back surface of the dental operating chair 10. The said controls will be coupled to the dental unit 20 by an additional flexible hose 75.

While there are above disclosed but a limited number of embodiments of the structure and product of the invention herein presented, it is possible to produce still other embodiments without departing from the inventive concept herein disclosed, and it is desired, therefore, that only such limitations be imposed on the appended claims as are stated therein or required by the prior art.

Having thus described our invention and illustrated its use, what we claim as new and desire to secure by Letters Patent is:

1. A dental operating unit, comprising:
    (a) a hollow pillar-like stand,
    (b) flexible tubing interconnecting the interior of said stand with external controls and sources of power, water, waste, air and vacuum,
    (c) said stand resting on a plurality of wheels whereby said stand is mobile,
    (d) and weights on said stand in juxtaposition to said wheels whereby said stand will be stable.

2. A dental operating unit, comprising:
    (a) a hollow pillar-like stand,
    (b) flexible tubing interconnecting the interior of said stand with external controls and sources of power, water, waste, air and vacuum,
    (c) said stand resting on a plurality of wheels whereby said stand is mobile,
    (d) and weights on said stand in juxtaposition to said wheels whereby said stand will be stable,
    (e) and a water niche on one portion of said pillar-like stand, said water niche having a removable cover whereby it may be entirely covered when not in use.

3. A dental operating unit, comprising:
    (a) a hollow pillar-like stand,
    (b) flexible tubing interconnecting the interior of said stand with external controls and sources of power, water, waste, air and vacuum,
    (c) said stand resting on a plurality of wheels whereby said stand is mobile,
    (d) and weights on said stand in juxtaposition to said wheels whereby said stand will be stable,
    (e) and a water niche on one portion of said pillar-like stand, said water niche having a removable cover whereby it may be entirely covered when not in use,
    (f) and a cuspidor flexibly connected to said stand only by flexible tubing and controlled from said stand.

4. A dental operating unit as set forth in claim 3, further including a quick-disconnect adjustable coupling on said cuspidor whereby said cuspidor may be attached as desired.

5. A dental operating unit as set forth in claim 3, further including one or more exposed hollow bushings at said top of said stand, and a plurality of horizontally extending arms, each of said arms having a perpendicular shaft member at one end adapted to fit within and be thereby retained by said bushing, and an exposed hollow bushing at said other end of each of said horizontally extending arms to receive and thereby retain additional perpendicular shaft members.

6. A dental operating unit as set forth in claim 3 wherein means are provided to bias said cuspidor flexible tubing to a withdrawn position within said stand, said means including a weight slidingly located between one side of said stand and an internal vertical wall located in a spaced relationship from and parallel to said one side, said cuspidor flexible tubing being looped under said weight from above, whereby said weight will bias said tubing to a withdrawn position within said stand.

7. A dental unit assembly including a hollow pillar-like stand having a top, bottom and four sides, thereby forming an enclosure, flexible tubing interconnecting the interior of said enclosure with external controls and sources of power, water, waste, air and vacuum; said enclosure containing the motors, and drives and controls and pulleys for the operation of said dental unit assembly; said stand resting on a plurality of wheels whereby said stand is mobile; and a water niche on one portion of said pillar-like stand, said water niche having a removable cover whereby it may be entirely covered when not in use.

8. A dental unit assembly as set forth in claim 7, further including a cuspidor attached to said stand only by a flexible tube and controlled from said stand.

9. A dental unit assembly as set forth in claim 8, further including a quick-disconnect adjustable coupling on said cuspidor whereby said cuspidor may be attached to any desired surface.

10. A dental unit assembly as set forth in claim 9, further including weights on said stand in juxtaposition to said wheels whereby said stand will be stable.

11. A dental operating unit for use in conjunction with a dental chair, comprising:
    (a) a frame to support the dental appliances, said frame having a top, a bottom and sides forming a full enclosure,
    (b) said frame being substantially square in horizontal cross section,
    (c) and a recessed portion in said top to receive and restrain operating instruments,
    (d) said enclosure containing the motors, pulleys, drives, controls and connections for operation of the unit,
    (e) and flexible tubing interconnecting with said enclosure to supply air, electricity and water thereto, and conduct waste away,
    (f) and a plurality of wheels attached to said bottom whereby said unit is made mobile,
    (g) weights affixed to said bottom between said wheels to make said unit stable,
    (h) a water niche in one edge of said unit, and a cover for said water niche completely concealing the same, when desired,
    (i) and a cuspidor connected to said unit by flexible tubing, said cuspidor having an adjustable quick-disconnect coupling for any desired surface, said coupling including a T slot and guide.

References Cited by the Examiner
UNITED STATES PATENTS

| | | | |
|---|---|---|---|
| 2,308,812 | 1/1943 | Jankelson | 32—22 |
| 2,419,370 | 4/1947 | Roof | 32—22 |

RICHARD A. GAUDET, *Primary Examiner.*

ROBERT E. MORGAN, *Examiner.*